(12) United States Patent
Lu

(10) Patent No.: US 11,544,439 B2
(45) Date of Patent: Jan. 3, 2023

(54) INTEGRATED CIRCUIT HAVING EACH STANDARD CELL WITH SAME TARGET PITCH AND LAYOUT METHOD THEREOF

(71) Applicant: CHANGXIN MEMORY TECHNOLOGIES, INC., Hefei (CN)

(72) Inventor: Meixiang Lu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 0 days.

(21) Appl. No.: 17/453,893

(22) Filed: Nov. 8, 2021

(65) Prior Publication Data

US 2022/0300691 A1 Sep. 22, 2022

Related U.S. Application Data

(63) Continuation of application No. PCT/CN2021/106527, filed on Jul. 15, 2021.

(30) Foreign Application Priority Data

Mar. 17, 2021 (CN) .......................... 202110285294.7

(51) Int. Cl.
*G06F 30/392* (2020.01)
*H01L 27/02* (2006.01)
*G06F 111/10* (2020.01)

(52) U.S. Cl.
CPC ........ *G06F 30/392* (2020.01); *H01L 27/0207* (2013.01); *G06F 2111/10* (2020.01)

(58) Field of Classification Search
CPC .......................... G06F 30/392; H01L 27/0207
See application file for complete search history.

(56) References Cited

U.S. PATENT DOCUMENTS 5,847,421 A * 12/1998 Yamaguchi ......... H01L 27/0207
257/202
7,538,368 B2 5/2009 Yano
(Continued)

FOREIGN PATENT DOCUMENTS

CN 1710711 A 12/2005
CN 101312127 A 11/2008
(Continued)

OTHER PUBLICATIONS

International Search Report and English Translation cited in PCT/CN2021/106527 dated Dec. 22, 2021, 9 pages.
(Continued)

*Primary Examiner* — Michael Jung
(74) *Attorney, Agent, or Firm* — Cooper Legal Group, LLC

(57) ABSTRACT

Embodiments of the present application provide an integrated circuit and a layout method thereof. First, a first pitch of a first standard cell having a maximum gate length in multiple standard cells in an integrated circuit is determined. The first pitch is a distance between a central axis of a polysilicon gate in the first standard cell and central axes of virtual polysilicon gates in the first standard cell. Then, a distance between a polysilicon gate and virtual polysilicon gates in each of the standard cells is adjusted by using the first pitch and a gate length of each of the standard cells. After the adjustment, a distance between a central axis of the polysilicon gate in each of the standard cells and central axes of the virtual polysilicon gates in each of the standard cells is the same as the first pitch.

12 Claims, 5 Drawing Sheets

(56) References Cited

U.S. PATENT DOCUMENTS

| | | | |
|---|---|---|---|
| 7,682,757 B2 | 3/2010 | Mashita et al. | |
| 8,053,346 B2 | 11/2011 | Ryu et al. | |
| 10,090,289 B1 | 10/2018 | Hsu et al. | |
| 2005/0280031 A1* | 12/2005 | Yano | H01L 27/11807 257/210 |
| 2014/0191295 A1* | 7/2014 | Greene | H01L 27/0207 257/288 |
| 2015/0287718 A1 | 10/2015 | Shim et al. | |
| 2019/0074297 A1* | 3/2019 | Kishishita | H01L 27/0924 |
| 2019/0123063 A1* | 4/2019 | Hino | H01L 29/78696 |

FOREIGN PATENT DOCUMENTS

| | | |
|---|---|---|
| CN | 107978598 A | 5/2018 |
| CN | 109524394 A | 3/2019 |

OTHER PUBLICATIONS

Written Opinion and English Translation cited in PCT/CN2021/106527 dated Dec. 22, 2021, 7 pages.

\* cited by examiner

INTEGRATED CIRCUIT HAVING EACH STANDARD CELL WITH SAME TARGET PITCH AND LAYOUT METHOD THEREOF

CROSS-REFERENCE TO RELATED APPLICATIONS

This is a continuation of International Application No. PCT/CN2021/106527, filed on Jul. 15, 2021, which claims the priority to Chinese Patent Application No. 202110285294.7, titled "INTEGRATED CIRCUIT AND LAYOUT METHOD THEREOF", filed with China National Intellectual Property Administration (CNIPA) on Mar. 17, 2021. The entire contents of International Application No. PCT/CN2021/106527 and Chinese Patent Application No. 202110285294.7 are incorporated herein by reference.

TECHNICAL FIELD

Embodiments of the present application relate to the technical field of integrated circuits, and in particular, to an integrated circuit and a layout method thereof.

BACKGROUND

Integrated circuits are usually formed by integrating a plurality of standard cells and are currently widely applied to various electronic devices.

In a design process of an integrated circuit, a plurality of standard cells are selected from a standard cell library, and the plurality of standard cells are placed in corresponding positions for connection to form an integrated circuit. There may be some differences in gate lengths of standard cells in an existing integrated circuit, and such differences may lead to large errors in key graphic dimensions during integrated circuit production, affecting performance of the integrated circuit.

SUMMARY

According to a first aspect, an embodiment of the present application provides a layout method of an integrated circuit, where the integrated circuit includes multiple standard cells, each of the standard cells includes a polysilicon gate and virtual polysilicon gates, at least two of the multiple standard cells have different gate lengths, the gate length of the standard cell is a width of the polysilicon gate of the standard cell, and the method includes:

determining the standard cell having a maximum gate length in the multiple standard cells as a first standard cell;

determining a first pitch of the first standard cell, wherein the first pitch is a distance between a central axis of the polysilicon gate in the first standard cell and central axes of the virtual polysilicon gates in the first standard cell; and adjusting distances between the polysilicon gate and the virtual polysilicon gates in each of the standard cells based on the first pitch and the gate length of each of the standard cells, wherein after the adjustment, distances between a central axis of the polysilicon gate and central axes of the virtual polysilicon gates in each of the standard cells are the same as the first pitch.

According to a second aspect, an embodiment of the present application provides an integrated circuit, including multiple standard cells, wherein each of the standard cells includes a polysilicon gate and virtual polysilicon gates, at least two of the multiple standard cells have different gate lengths, and the gate length of the standard cell is a width of the polysilicon gate of the standard cell; and each of the standard cells has a same target pitch and the target pitch is a first pitch, the target pitch is a distance between a central axis of the polysilicon gate in each of the standard cells and central axes of the virtual polysilicon gates in each of the standard cells, the first pitch is determined based on the distance between the central axis of the polysilicon gate in a first standard cell and the central axes of the virtual polysilicon gates in the first standard cell, and the first standard cell is the standard cell having a maximum gate length in the multiple standard cells.

BRIEF DESCRIPTION OF THE DRAWINGS

To describe the technical solutions in the embodiments of the present application or in the prior art more clearly, the following briefly describes the accompanying drawings required for describing the embodiments of the present application or the prior art. Apparently, the accompanying drawings in the following description show some embodiments of the present application, and those of ordinary skill in the art may still derive other drawings from these accompanying drawings without creative efforts.

DETAILED DESCRIPTION

Figure 1:
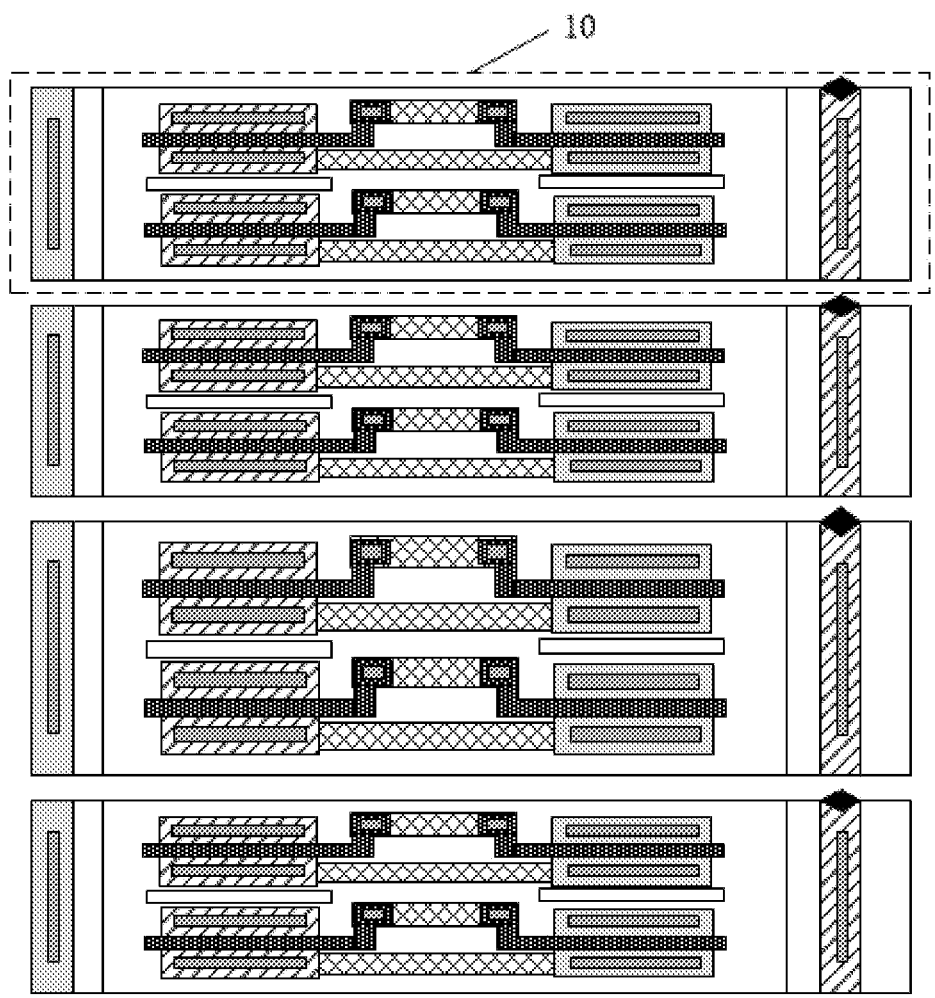
FIG. 1 is a partial schematic structural diagram of an integrated circuit according to an embodiment of the present application.

In order to make the objectives, technical solutions and advantages of the embodiments of the present application clearer, the following clearly and completely describes the technical solutions in the embodiments of the present application with reference to the accompanying drawings in the embodiments of the present application. Apparently, the described embodiments are some rather than all of the embodiments of the present application. All other embodiments obtained by those of ordinary skill in the art based on the embodiments of the present application without creative efforts should fall within the protection scope of the present application.

In this specification, the terms "first", "second", and so on used in the present application are intended to distinguish similar objects but do not necessarily indicate a specific order or sequence. It should be understood that data used in this way can be interchanged under appropriate circumstances. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

An integrated circuit may be defined as a plurality of cells, and may be designed using a cell library including characteristic information of the plurality of cells. In the cell library, a name, a size, a gate width, a pin, a delay characteristic, a leakage current, a threshold voltage, a function, and the like of a cell can be defined. A typical cell library set may include a basic cell such as AND, OR, NOR, or INVERTER, a composite cell such as OAI (OR/AND/INVERTER) and AOI (AND/OR/INVERTER), and a storage element such as a simple master-slave flip flop or a latch.

The cell library may be a standard cell library. The standard cell library is one of basic data supporting an automation procedure of a digital integrated circuit design. The standard cell library constructs an entire automation design procedure of the integrated circuit from front-end function simulation to back-end layout implementation. The standard cell library usually includes multiple standard cells designed in advance, including a device layout graphics and circuit performance values such as an area, circuit power consumption, a time sequence, and a drive capability. The standard cell has a common interface implementation and a rule structure. An integrated circuit designer or a synthesis tool calls a needed standard cell in the standard cell library according to a design requirement to complete the layout design of the integrated circuit. The design of the integrated circuit based on the standard cell library can greatly improve the design efficiency of the circuit.

There may be some differences in gate lengths of standard cells in an existing integrated circuit. Therefore, after the standard cells are connected, sizes of spaces occupied by the standard cells also differ, easily leading to large errors in key graphic dimensions of the integrated circuit during process production, and affecting performance of the integrated circuit.

To resolve the foregoing technical problem, an embodiment of the present application provides a layout method of an integrated circuit. First, a first pitch of a first standard cell having a maximum gate length in multiple standard cells in an integrated circuit is determined. The first pitch is a distance between a central axis of a polysilicon gate in the first standard cell and central axes of virtual polysilicon gates in the first standard cell. Then, a size of each standard cell is adjusted by using the first pitch and a gate length of each standard cell. After the adjustment, a distance between a central axis of a polysilicon gate in each standard cell and central axes of virtual polysilicon gates in each standard cell is the same as the first pitch. In this way, after standard cells having different gate lengths are integrated, sizes of spaces occupied by the standard cells can remain consistent, thereby effectively reducing errors in key graphic dimensions of the integrated circuit during process production and improving performance of the integrated circuit.

The layout method of the integrated circuit may be applied to the design of any logic circuit layout, which is described in detail below by using detailed embodiments.

FIG. 1 is a partial schematic structural diagram of an integrated circuit according to an embodiment of the present application. In this embodiment of the present application, the integrated circuit includes multiple standard cells 10.

In a feasible implementation, at least two of the multiple standard cells 10 have different gate lengths.

As shown in FIG. 1, a gate length of a third standard cell from top to bottom is greater than a gate length of each of the other three standard cells.

Figure 2:
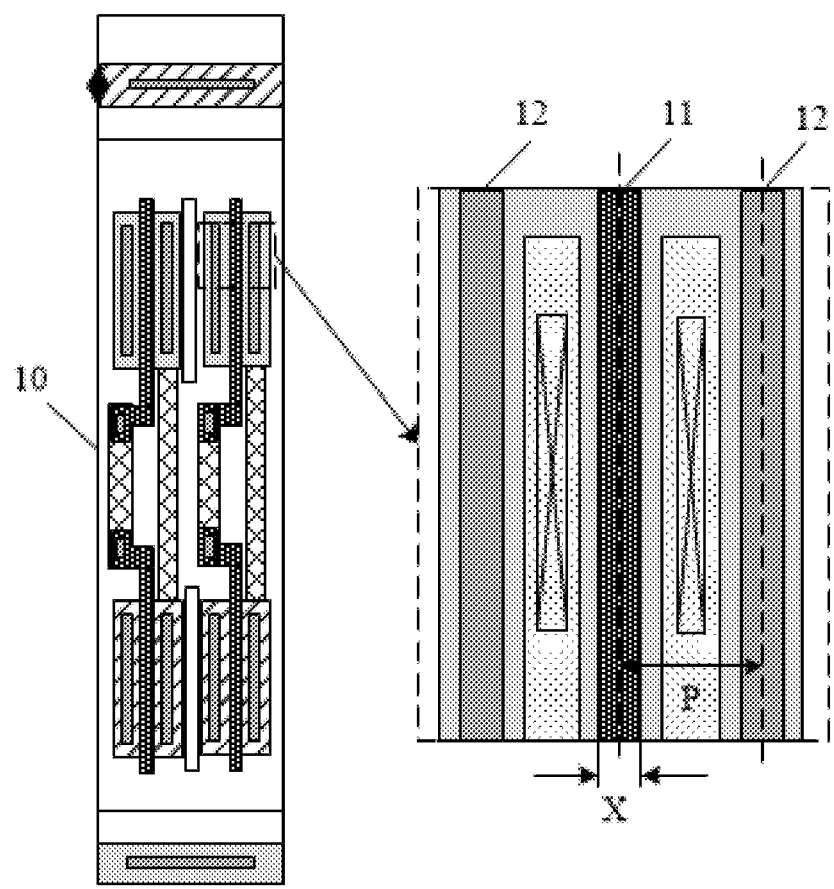
FIG. 2 is a schematic structural diagram of a standard cell according to an embodiment of the present application.

FIG. 2 is a schematic structural diagram of a standard cell according to an embodiment of the present application. In this embodiment of the present application, each standard cell 10 includes a polysilicon gate 11 and virtual polysilicon gates 12.

In a feasible implementation, a gate length X of each standard cell is a width of the polysilicon gate 11 in each standard cell. The width of the polysilicon gate 11 in each standard cell is equal to a width of the virtual polysilicon gates 12 in each standard cell.

Figure 3:
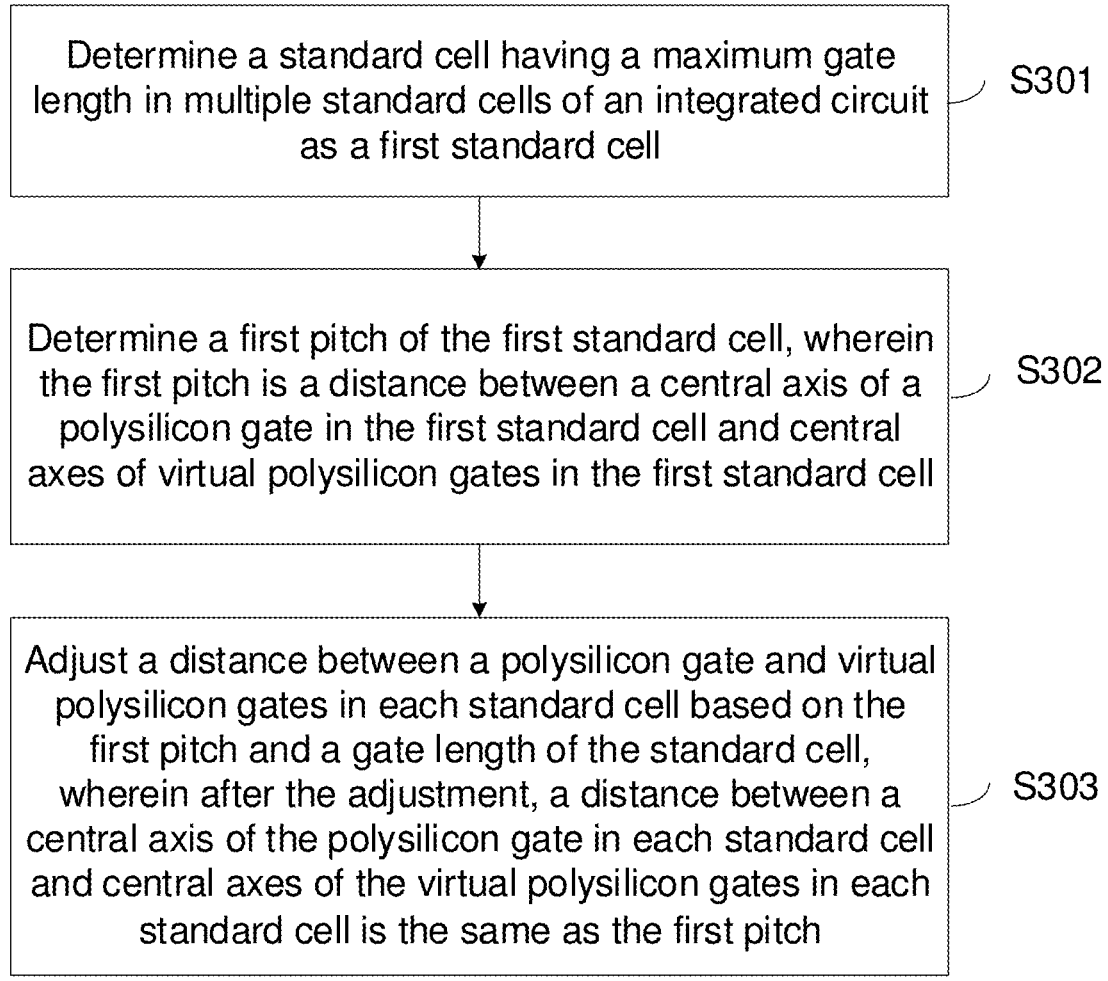
FIG. 3 is a schematic flowchart of a layout method of an integrated circuit according to an embodiment of the present application.

FIG. 3 is a schematic flowchart of a layout method of an integrated circuit according to an embodiment of the present application. The layout method of the integrated circuit includes:

S301. Determine a standard cell having a maximum gate length in multiple standard cells of the integrated circuit as a first standard cell.

In this embodiment of the present application, a gate length of each standard cell in the integrated circuit is determined, and the standard cell having the maximum gate length is selected as the first standard cell. For example, it is assumed that there are three standard cells STD1, STD2, and STD3 having different gate lengths, their corresponding gate lengths are respectively x1, x2, and x3, and x1<x2<x3. In this embodiment of the present application, the standard cell STD3 may be used as the first standard cell.

S302. Determine a first pitch of the first standard cell, where the first pitch is a distance between a central axis of a polysilicon gate in the first standard cell and central axes of virtual polysilicon gates in the first standard cell.

For better understanding of this embodiment of the present application, referring to FIG. 2, the distance between the central axis of the polysilicon gate 11 and the central axes of the virtual polysilicon gates 12 may be represented by a first pitch P.

S303. Adjust a distance between a polysilicon gate and virtual polysilicon gates in each standard cell based on the first pitch and the gate length of the standard cell, where after the adjustment, a distance between a central axis of the polysilicon gate in each standard cell and central axes of the virtual polysilicon gates in each standard cell is the same as the first pitch.

In this embodiment of the present application, after the first pitch is determined, the first pitch is used as a reference pitch between the polysilicon gate and the virtual polysilicon gates in each standard cell, and then distances between the polysilicon gate and the virtual polysilicon gates in each standard cell are adjusted based on the gate length of each standard cell, so that after the adjustment, the distances between the central axis of the polysilicon gate and the central axes of the virtual polysilicon gates in each standard cell are the same as the first pitch.

It may be understood that, in a conventional technical solution, for each standard cell in a standard cell library, before any adjustment, a pitch between a polysilicon gate and virtual polysilicon gates in each standard cell is positively correlated with a gate length of the polysilicon gate. Therefore, a pitch between a polysilicon gate and virtual polysilicon gates in a standard cell having a larger gate length is greater than a pitch between a polysilicon gate and virtual polysilicon gates in a standard cell having a smaller gate length.

Therefore, in this embodiment of the present application, the distances between the polysilicon gate and the virtual polysilicon gates in each standard cell may be adjusted based on the first pitch and the gate length of each standard cell, so that the distances between the central axis of the polysilicon gate and the central axes of the virtual polysilicon gates in each standard cell remain consistent.

According to the layout method of the integrated circuit provided in this embodiment of the present application, the distances between the polysilicon gate and the virtual polysilicon gates in each standard cell are adjusted by using the first pitch and the gate length of each standard cell, so that after the adjusting, the distances between the central axis of the polysilicon gate and the central axes of the virtual polysilicon gates in each standard cell are the same as the first pitch. In this way, after standard cells having different gate lengths are integrated, a size of a space occupied by each standard cell is not affected by the gate length, thereby effectively reducing errors in key graphic dimensions during integrated circuit production and improving performance of the integrated circuit.

Figure 4:
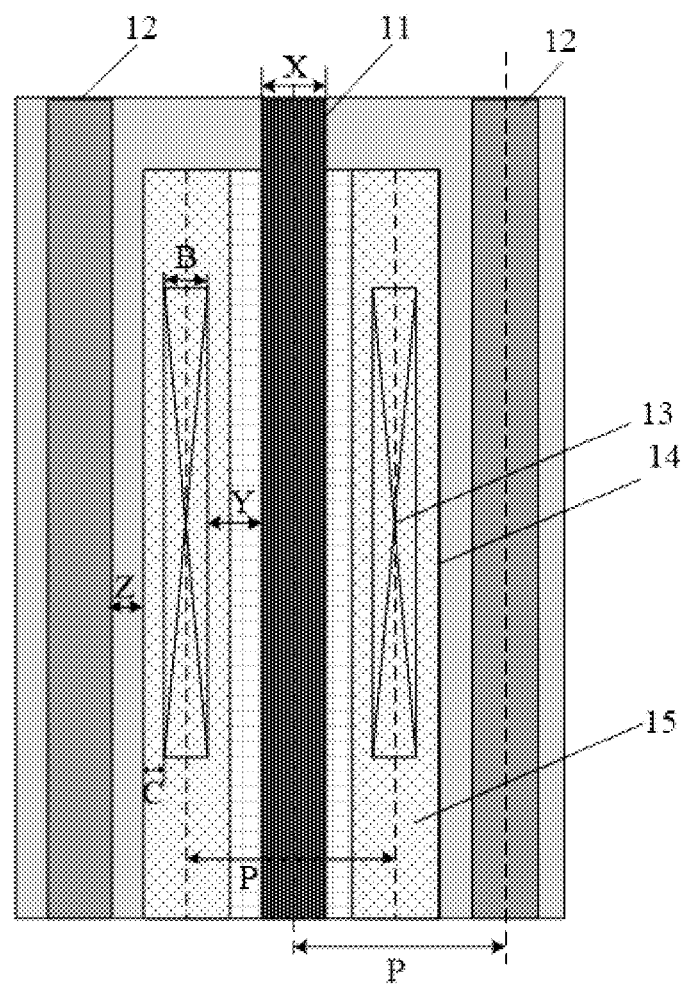
FIG. 4 is a partial schematic structural diagram of a standard cell according to an embodiment of the present application.

Based on the content described in the foregoing embodiment, in a feasible implementation of an embodiment of the present application, FIG. 4 is a partial schematic structural diagram of a standard cell according to an embodiment of the present application. In this embodiment of the present application, each standard cell 10 further includes contact structures 13 and active regions 14.

The contact structures 13 are located between the polysilicon gate 11 and each of the virtual polysilicon gates 12 in the standard cell and located in the active regions 14. The active regions 14 are located between two virtual polysilicon gates 12 in the standard cell.

In a feasible implementation of the present application, the adjusting distances between the polysilicon gate and the virtual polysilicon gates in each standard cell based on the first pitch and the gate length of the standard cell described in step S303 specifically includes the following steps:

Step I. Determine a first spacing distance between the contact structures and the polysilicon gate in each standard cell and a second spacing distance between the virtual polysilicon gates and the active regions in each standard cell based on the first pitch and the gate length of each standard cell.

For better understanding of this embodiment of the present application, referring to FIG. 4, a first spacing distance between contact structures 13 and a polysilicon gate 11 in any standard cell is a distance Y, and a second spacing distance between virtual polysilicon gates 12 and active regions 14 in any standard cell is a distance Z.

In a feasible implementation, the first spacing distance between the contact structures and the polysilicon gate in each standard cell may be determined based on the first pitch P, the gate length of each standard cell, and a width of the contact structures.

Optionally, the first spacing distance between the contact structures and the polysilicon gate in each standard cell may be calculated in the following manner:

$$Y_i = \frac{1}{2}P - \frac{1}{2}X_i - \frac{1}{2}B_i$$

where $Y_i$ represents a first spacing distance $Y_i$ between contact structures and a polysilicon gate in an $i^{th}$ standard cell, P represents the foregoing first pitch, $X_i$ represents a gate length of the $i^{th}$ standard cell, and $B_i$ represents a width of the contact structures in the $i^{th}$ standard cell.

For better understanding of this embodiment of the present application, referring to FIG. 4, the width of the contact structures in each standard cell may be represented by a distance B shown in FIG. 4.

In a feasible implementation, the second spacing distance between the virtual polysilicon gates and the active regions in each standard cell may be determined based on the first pitch P, the gate length, the width of the contact structures, and a distance from one of the contact structures to a boundary of one of the active regions in each standard cell.

Optionally, the second spacing distance between the virtual polysilicon gates and the active regions in each standard cell may be calculated in the following manner:

$$Z_i = \frac{1}{2}P - \frac{1}{2}X_i - \frac{1}{2}B_i - C_i$$

where $Z_i$ represents a second spacing distance between virtual polysilicon gates and active regions in an $i^{th}$ standard cell, P represents the foregoing first pitch, $X_i$ represents a gate length of the $i^{th}$ standard cell, $B_i$ represents a width of contact structures in the $i^{th}$ standard cell, and $C_i$ represents a distance from one of the contact structures to a boundary of one of the active regions in the $i^{th}$ standard cell.

For better understanding of this embodiment of the present application, referring to FIG. 4, the distance from one of the contact structures to the boundary of one of the active regions in the standard cell may be determined by a distance C shown in FIG. 4.

Step II. Adjust a spacing distance between the contact structures and the polysilicon gate in each standard cell based on the first spacing distance between the contact structures and the polysilicon gate in each standard cell, so that the spacing distance between the contact structures and the polysilicon gate in each standard cell is the same as the first spacing distance corresponding to each standard cell.

Step III. Adjust a spacing distance between the virtual polysilicon gates and the active regions in each standard cell based on the second spacing distance between the virtual polysilicon gates and the active regions in each standard cell, so that the spacing distance between the virtual polysilicon gates and the active regions in each standard cell is the same as the second spacing distance corresponding to each standard cell.

It should be noted that, there is no particular order for performing step II and step III, that is, step II and step III may be performed at the same time, or step II may be performed first and then step III is performed, or step III may be performed first and then step II is performed.

In this embodiment of the present application, the spacing distance between the contact structures and the polysilicon gate and the spacing distance between the virtual polysilicon gates and the active regions in each standard cell are adjusted based on the foregoing determined first spacing distance $Y_i$ and second spacing distance $Z_i$, so that after the adjustment, a distance between a central axis of the polysilicon gate in each standard cell and central axes of the virtual polysilicon gates in each standard cell is the same as the foregoing first pitch P.

In a feasible implementation of this embodiment of the present application, referring to FIG. 4, each standard cell 10 further includes metal layers 15. The metal layers 15 are located between the polysilicon gate 11 and each of the virtual polysilicon gates 12 in each standard cell. The contact structures 13 are located in the metal layers 15. Edges of the active regions 14 coincide with edges of the metal layers 15.

In some embodiments, the width of the polysilicon gate is the same as a width of the virtual polysilicon gates. The metal layers 15 are located exactly in the middle of the polysilicon gate 11 and the virtual polysilicon gates 12 in the standard cell. Because a distance from a central axis of the metal layer 15 to the central axis of the polysilicon gate 11 or the virtual polysilicon gate 12 is 1/2P, a distance between central axes of two metal layers is also P. In this way, when the first pitch P corresponding to each standard cell is the same, a distance between central axes of two metal layers in each standard cell is also the same.

That is, according to the layout method of the integrated circuit provided in this embodiment of the present application, the distances between the polysilicon gate and the virtual polysilicon gates in each standard cell are adjusted, so that after the adjusting, the distances between the central axis of the polysilicon gate and the central axes of the virtual polysilicon gates in each standard cell are the same as the foregoing first pitch, and after standard cells having different gate lengths are integrated, distances between metal layers in the standard cells can also remain the same, thereby further reducing errors in key graphic dimensions during integrated circuit production.

Based on the content described in the foregoing embodiment, in a feasible implementation of this embodiment of the present application, the first pitch of the first standard cell may be determined based on a gate length of the first standard cell, a spacing distance between contact structures and the polysilicon gate in the first standard cell, a width of the contact structures in the first standard cell, a distance from one of the contact structures to a boundary of one of the active regions in the first standard cell, a spacing distance between the virtual polysilicon gates and the active regions in the first standard cell, and a width of the virtual polysilicon gates in the first standard cell.

Figure 5:
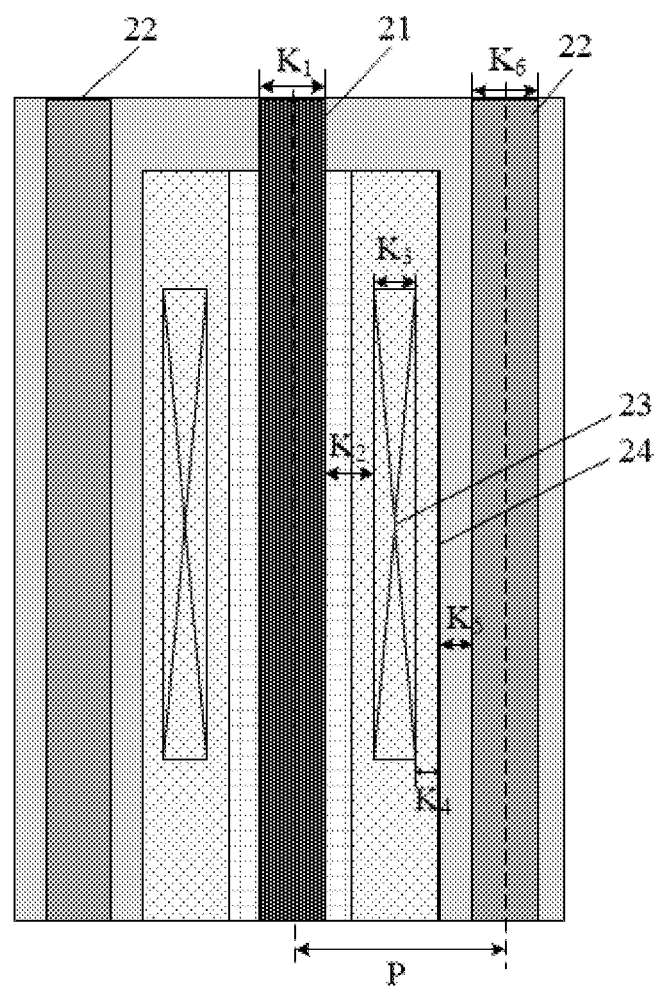
FIG. 5 is a partial schematic structural diagram of another standard cell according to an embodiment of the present application.

Optionally, FIG. 5 is a partial schematic structural diagram of another standard cell according to an embodiment of the present application. The standard cell is the first standard cell described in the foregoing embodiment. In a feasible implementation, the foregoing first pitch may be determined in the following manner:

$$P = \frac{1}{2}K_1 + K_2 + K_3 + K_4 + K_5 + \frac{1}{2}K_6;$$

where P represents the foregoing first pitch, $K_1$ represents the gate length of the first standard cell, $K_2$ represents the spacing distance between the contact structures 23 and the polysilicon gate 21 in the first standard cell, $K_3$ represents the width of the contact structures 23 in the first standard cell, $K_4$ represents the distance from one of the contact structures 23 to the boundary of one of the active regions 24 in the first standard cell, $K_5$ represents the spacing distance between the virtual polysilicon gates 22 and the active regions 24 in the first standard cell, and $K_6$ represents the width of the virtual polysilicon gates 22 in the first standard cell.

Based on the content described in the foregoing embodiment, in another feasible implementation of this embodiment of the present application, alternatively, the first pitch may be determined by directly measuring the central axis of the polysilicon gate in the first standard cell and the central axes of the virtual polysilicon gates in the first standard cell.

Based on the content described in the foregoing embodiment, in a feasible implementation of this embodiment of the present application, after the distances between the polysilicon gate and the virtual polysilicon gates in each standard cell are adjusted, when a gate length of a target standard cell in the standard cells changes, a first spacing distance between contact structures and a polysilicon gate in the target standard cell and a second spacing distance between virtual polysilicon gates and active regions in the target standard cell may be updated based on the changed gate length, then a spacing distance between the contact structures and the polysilicon gate in the target standard cell is readjusted based on the updated first spacing distance between the contact structures and the polysilicon gate in the target standard cell, and a spacing distance between the virtual polysilicon gates and the active regions in the target standard cell is readjusted base on the updated second spacing distance between the virtual polysilicon gates and the active regions in the target standard cell.

For example, it is assumed that there are three standard cells STD1, STD2, and STD3 having different gate lengths, their corresponding gate lengths are respectively x1, x2, and x3, and x1<x2<x3. In this case, when the gate length of the standard cell STD2 needs to be changed to the same gate length as the standard cell STD3, only a parameter of the gate length of the standard cell STD2 needs to be adjusted in a circuit diagram. After the parameter of the gate length of the standard cell STD2 is adjusted, a spacing distance between contact structures and a polysilicon gate and a spacing distance between virtual polysilicon gates and active regions in the standard cell STD2 in the layout are automatically updated based on the adjusted gate length of the standard cell STD2.

After the update, a distance between a central axis of the polysilicon gate and central axes of the virtual polysilicon gates in the standard cell STD2 remains to be the first pitch. Therefore, in this embodiment of the present application, after the gate length of the standard cell STD2 is adjusted, the other standard cells are not affected, and there is no need to make any changes to the other standard cells. In addition, in the present application, only a polycrystalline silicon layer (poly layer) needs to be adjusted to complete modification of the design. After such adjustment, only a graphic of the poly layer has changed during a manufacturing process, and positions and sizes of other graphic layers do not change.

According to the layout method of the integrated circuit provided in this embodiment of the present application, the distances between the polysilicon gate and the virtual polysilicon gates in each standard cell are adjusted, so that after the adjusting, the distances between the central axis of the polysilicon gate and the central axes of the virtual polysilicon gates in each standard cell are the same, and after standard cells having different gate lengths are integrated, complexity of the modification of the integrated circuit can be greatly reduced and a layout time for the integrated circuit can be reduced.

Those of ordinary skill in the art can understand that all or some of the steps in the foregoing methods embodiments may be implemented by a program instructing relevant hardware. The program may be stored in a computer readable storage medium. When the program is executed, the steps including the foregoing method embodiments are performed. The foregoing storage medium includes: a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk, and various other media that can store program code.

Based on the layout method of the integrated circuit described in the foregoing embodiment, an embodiment of the present application further provides an integrated circuit, and reference may be made to FIG. 1 and FIG. 2. The integrated circuit includes multiple standard cells 10. Each standard cell includes a polysilicon gate 11 and virtual polysilicon gates 12. At least two of the multiple standard cells have different gate lengths. A gate length of the standard cell is a width X of the polysilicon gate 11 of the standard cell.

Each standard cell has a same target pitch that is a first pitch P. The target pitch is in a distance between a central axis of the polysilicon gate 11 and central axes of the virtual polysilicon gates 12 in each standard cell. The first pitch P is determined based on a distance between a central axis of a polysilicon gate in a first standard cell and central axes of virtual polysilicon gates in the first standard cell. The first standard cell is a standard cell having a maximum gate length in the multiple standard cells.

According to the integrated circuit provided in this embodiment of the present application, the distance between the central axis of the polysilicon gate and the central axes of the virtual polysilicon gates in each standard cell in the integrated circuit is the same, that is, a size of a space occupied by each standard cell is not affected by the gate length, thereby effectively reducing errors in key graphic dimensions during integrated circuit production and improving performance of the integrated circuit.

In a feasible implementation, reference may be made to FIG. 4, each standard cell further includes contact structures 13 and active regions 14. A first spacing distance between the contact structures and the polysilicon gate in each standard cell and a second spacing distance between the virtual polysilicon gates and the active regions in each standard cell may be both determined based on the foregoing first pitch and the gate length of each standard cell.

In a feasible implementation, the first spacing distance between the contact structures and the polysilicon gate in each standard cell may be determined based on the foregoing first pitch, the gate length of each standard cell, and a width of the contact structures; and the second spacing distance between the virtual polysilicon gates and the active regions in each standard cell may be determined based on the foregoing first pitch, the gate length, the width of the contact structures, and a distance from one of the contact structures to a boundary of one of the active regions in each the standard cell.

For example, a first spacing distance $Y_i$ between contact structures and a polysilicon gate in an $i^{th}$ standard cell is determined in the following manner:

$$Y_i = \frac{1}{2}P - \frac{1}{2}X_i - \frac{1}{2}B_i;$$

and
a second spacing distance $Z_i$ between virtual polysilicon gates and active regions in the $i^{th}$ standard cell is determined the following manner:

$$Z_i = \frac{1}{2}P - \frac{1}{2}X_i - \frac{1}{2}B_i - C_i$$

where P represents the first pitch, $X_i$ represents a gate length of the $i^{th}$ standard cell, $B_i$ represents a width of the contact structures in the $i^{th}$ standard cell, and $C_i$ represents a distance from one of the contact structures to a boundary of one of the active regions in the $i^{th}$ standard cell.

In a feasible implementation, the foregoing first pitch may be determined based on a gate length of the first standard cell, a spacing distance between contact structures and the polysilicon gate in the first standard cell, a width of the contact structures in the first standard cell, a distance from one of the contact structures to a boundary of one of the active regions in the first standard cell, a spacing distance between the virtual polysilicon gates and the active regions in the first standard cell, and a width of the virtual polysilicon gates in the first standard cell.

For example, reference may be made to FIG. 5, and the foregoing first pitch P is determined in the following manner:

$$P = \frac{1}{2}K_1 + K_2 + K_3 + K_4 + K_5 + \frac{1}{2}K_6;$$

where P represents the foregoing first pitch, $K_1$ represents the gate length of the first standard cell, $K_2$ represents the spacing distance between the contact structures 23 and the polysilicon gate 21 in the first standard cell, $K_3$ represents the width of the contact structures 23 in the first standard cell, $K_4$ represents the distance from one of the contact structures 23 to the boundary of one of the active regions 24 in the first standard cell, $K_5$ represents the spacing distance between the virtual polysilicon gates 22 and the active regions 24 in the first standard cell, and $K_6$ represents the width of the virtual polysilicon gates 22 in the first standard cell.

According to the integrated circuit provided in this embodiment of the present application, the distances between the polysilicon gate and the virtual polysilicon gates in each standard cell are adjusted, so that after the adjusting, the distances between the central axis of the polysilicon gate and the central axes of the virtual polysilicon gates in each standard cell are the same, and after standard cells having different gate lengths are integrated, complexity of the modification of the integrated circuit can be greatly reduced and a layout time for the integrated circuit can be reduced.

Finally, it should be noted that the above embodiments are merely used to explain the technical solutions of the present application, but are not intended to limit the present application. Although the present application is described in detail with reference to the foregoing embodiments, those of ordinary skill in the art should understand that they can still modify the technical solutions described in the foregoing embodiments, or make equivalent substitutions on some or all technical features therein. These modifications or substitutions do not make the essence of the corresponding technical solutions deviate from the spirit and scope of the technical solutions of the embodiments of the present application.

The invention claimed is:

1. A layout method of an integrated circuit, wherein the integrated circuit comprises multiple standard cells, each of the standard cells comprises a polysilicon gate and virtual polysilicon gates, at least two of the multiple standard cells have different gate lengths, the gate length of the standard cell is a width of the polysilicon gate of the standard cell, and the method comprises:

determining the standard cell having a maximum gate length in the multiple standard cells as a first standard cell;

determining a first pitch of the first standard cell, wherein the first pitch is a distance between a central axis of the polysilicon gate in the first standard cell and central axes of the virtual polysilicon gates in the first standard cell; and adjusting distances between the polysilicon gate and the virtual polysilicon gates in each of the standard cells based on the first pitch and the gate length of each of the standard cells, wherein after the adjustment, distances between a central axis of the polysilicon gate and central axes of the virtual polysilicon gates in each of the standard cells are the same as the first pitch.

2. The method according to claim 1, wherein each of the standard cells further comprises contact structures and active regions, the contact structures are located between the polysilicon gate and each of the virtual polysilicon gates in each of the standard cells and located in the active regions, and the active regions are located between two virtual polysilicon gates in each of the standard cells; and the adjusting distances between the polysilicon gate and the virtual polysilicon gates in each of the standard cells based on the first pitch and the gate length of each of the standard cells comprises:

determining a first spacing distance between the contact structures and the polysilicon gate in each of the standard cells and a second spacing distance between the virtual polysilicon gates and the active regions in each of the standard cells based on the first pitch and the gate length of each of the standard cells; and adjusting a spacing distance between the contact structures and the polysilicon gate in each of the standard cells to be the first spacing distance corresponding to each of the standard cells; and adjusting a spacing distance between the virtual polysilicon gates and the active regions in each of the standard cells to be the second spacing distance corresponding to each of the standard cells.

3. The method according to claim 2, wherein the determining a first spacing distance between the contact structures and the polysilicon gate in each of the standard cells and a second spacing distance between the virtual polysilicon gates and the active regions in each of the standard cells based on the first pitch and the gate length of each of the standard cells comprises:

determining the first spacing distance between the contact structures and the polysilicon gate in each of the standard cells based on the first pitch, the gate length of each of the standard cells, and a width of the contact structures; and determining the second spacing distance between the virtual polysilicon gates and the active regions in each of the standard cells based on the first pitch, the gate length, the width of the contact structures, and a distance from one of the contact structures to a boundary of one of the active regions in each of the standard cells.

4. The method according to claim 3, wherein the determining the first spacing distance between the contact structures and the polysilicon gate in each of the standard cells based on the first pitch, the gate length of each of the standard cells, and a width of the contact structures comprises:

calculating a first spacing distance $Y_i$ between the contact structures and the polysilicon gate in an $i^{th}$ standard cell in the following manner:

$$Y_i = \frac{1}{2}P - \frac{1}{2}X_i - \frac{1}{2}B_i; \text{ and}$$

wherein the P represents the first pitch, the $X_i$ represents the gate length of the $i^{th}$ standard cell, and the $B_i$ represents the width of the contact structures of the $i^{th}$ standard cell.

5. The method according to claim 3, wherein the determining the second spacing distance between the virtual polysilicon gates and the active regions in each of the standard cells based on the first pitch, the gate length, the width of the contact structures, and a distance from one of the contact structures to a boundary of one of the active regions in each of the standard cells comprises:

calculating a second spacing distance $Z_i$ between the virtual polysilicon gates and the active regions in an $i^{th}$ standard cell in the following manner:

$$Z_i = \frac{1}{2}P - \frac{1}{2}X_i - \frac{1}{2}B_i - C_i; \text{ and}$$

wherein the P represents the first pitch, the $X_i$ represents the gate length of the $i^{th}$ standard cell, the $B_i$ represents the width of the contact structures in the $i^{th}$ standard cell, and the $C_i$ represents the distance from one of the contact structures to the boundary of one of the active regions in the $i^{th}$ standard cell.

6. The method according to claim 1, wherein each of the standard cells further comprises contact structures and active regions, the contact structures are located between the polysilicon gate and each of the virtual polysilicon gates in each of the standard cells and located in the active regions, and the active regions are located between two virtual polysilicon gates in each of the standard cells; and the determining a first pitch of the first standard cell comprises:

determining the first pitch based on the gate length of the first standard cell, a spacing distance between the contact structures and the polysilicon gate in the first standard cell, a width of the contact structures in the first standard cell, a distance from one of the contact structures to a boundary of one of the active regions in the first standard cell, a spacing distance between the virtual polysilicon gates and the active regions in the first standard cell, and a width of the virtual polysilicon gates in the first standard cell.

7. The method according to claim 6, wherein the determining the first pitch based on the gate length of the first standard cell, a spacing distance between the contact structures and the polysilicon gate in the first standard cell, a width of the contact structures in the first standard cell, a distance from one of the contact structures to a boundary of one of the active regions in the first standard cell, a spacing distance between the virtual polysilicon gates and the active regions in the first standard cell, and a width of the virtual polysilicon gates in the first standard cell comprises:

determining the first pitch in the following manner:

$$P = \frac{1}{2}K_1 + K_2 + K_3 + K_4 + K_5 + \frac{1}{2}K_6; \text{ and}$$

wherein the P represents the first pitch, the $K_1$ represents the gate length of the first standard cell, the $K_2$ represents the spacing distance between the contact structures and the polysilicon gate in the first standard cell, the $K_3$ represents the width of the contact structures in the first standard cell, the $K_4$ represents the distance from one of the contact structures to the boundary of one of the active regions in the first standard cell, the $K_5$ represents the spacing distance between the virtual polysilicon gates and the active regions in the first standard cell, and the $K_6$ represents the width of the virtual polysilicon gates in the first standard cell.

8. The method according to claim 1, wherein after the adjusting distances between the polysilicon gate and the virtual polysilicon gates in each of the standard cells based on the first pitch and the gate length of each of the standard cells, the method further comprises:
when the gate length of a target standard cell in the standard cells changes, updating a first spacing distance between contact structures and the polysilicon gate in the target standard cell and updating a second spacing distance between the virtual polysilicon gates and active regions in the target standard cell based on the changed gate length; and
adjusting a spacing distance between the contact structures and the polysilicon gate in the target standard cell to be the updated first spacing distance in the target standard cell, and adjusting a spacing distance between the virtual polysilicon gates and the active regions in the target standard cell to be the updated second spacing distance in the target standard cell.

9. An integrated circuit, comprising multiple standard cells, wherein each of the standard cells comprises a polysilicon gate and virtual polysilicon gates, at least two of the multiple standard cells have different gate lengths, and the gate length of the standard cell is a width of the polysilicon gate of the standard cell; and
each of the standard cells has a same target pitch and the target pitch is a first pitch, the target pitch is a distance between a central axis of the polysilicon gate in each of the standard cells and central axes of the virtual polysilicon gates in each of the standard cells, the first pitch is determined based on the distance between the central axis of the polysilicon gate in a first standard cell and the central axes of the virtual polysilicon gates in the first standard cell, and the first standard cell is the standard cell having a maximum gate length in the multiple standard cells;
wherein each of the standard cells further comprises contact structures and active regions, the contact structures are located between the polysilicon gate and each of the virtual polysilicon gates in each of the standard cells and located in the active regions, and the active regions are located between two virtual polysilicon gates in each of the standard cells;
wherein a first spacing distance between the contact structures and the polysilicon gate in each of the standard cells and a second spacing distance between the virtual polysilicon gates and the active regions in each of the standard cells are both determined based on the first pitch and the gate length of each of the standard cells;
wherein the first spacing distance between the contact structures and the polysilicon gate in each of the standard cells is determined based on the first pitch, the gate length of each of the standard cells, and a width of the contact structures;

wherein the second spacing distance between the virtual polysilicon gates and the active regions in each of the standard cells is determined based on the first pitch, the gate length, the width of the contact structures, and a distance from one of the contact structures to a boundary of one of the active regions in each of the standard cells;
wherein a first spacing distance $Y_i$ between the contact structures and the polysilicon gate in an $i^{th}$ standard cell is determined in the following manner:

$$Y_i = \frac{1}{2}P - \frac{1}{2}X_i - \frac{1}{2}B_i; \text{ and}$$

wherein the P represents the first pitch, the $X_i$ represents the gate length of the $i^{th}$ standard cell, and the $B_i$ represents the width of the contact structures of the $i^{th}$ standard cell.

10. The integrated circuit according to claim 9, wherein a second spacing distance $Z_i$ between the virtual polysilicon gates and the active regions in the $i^{th}$ standard cell is determined in the following manner:

$$Z_i = \frac{1}{2}P - \frac{1}{2}X_i - \frac{1}{2}B_i - C_i; \text{ and}$$

wherein the P represents the first pitch, the $X_i$ represents the gate length of the $i^{th}$ standard cell, the $B_i$ represents the width of the contact structures in the $i^{th}$ standard cell, and the $C_i$ represents the distance from one of the contact structures to the boundary of one of the active regions in the $i^{th}$ standard cell.

11. The integrated circuit according to claim 9, wherein the first pitch is determined based on the gate length of the first standard cell, a spacing distance between the contact structures and the polysilicon gate in the first standard cell, the width of the contact structures in the first standard cell, the distance from one of the contact structures to the boundary of one of the active regions in the first standard cell, a spacing distance between the virtual polysilicon gates and the active regions in the first standard cell, and a width of the virtual polysilicon gates in the first standard cell.

12. The integrated circuit according to claim 11, wherein the first pitch is determined in the following manner:

$$P = \frac{1}{2}K_1 + K_2 + K_3 + K_4 + K_5 + \frac{1}{2}K_6; \text{ and}$$

wherein the P represents the first pitch, the $K_1$ represents the gate length of the first standard cell, the $K_2$ represents the spacing distance between the contact structures and the polysilicon gate in the first standard cell, the $K_3$ represents the width of the contact structures in the first standard cell, the $K_4$ represents the distance from one of the contact structures to the boundary of one of the active regions in the first standard cell, the $K_5$ represents the spacing distance between the virtual polysilicon gates and the active regions in the first standard cell, and the $K_6$ represents the width of the virtual polysilicon gates in the first standard cell.

* * * * *